United States Patent Office 2,828,693
Patented Apr. 1, 1958

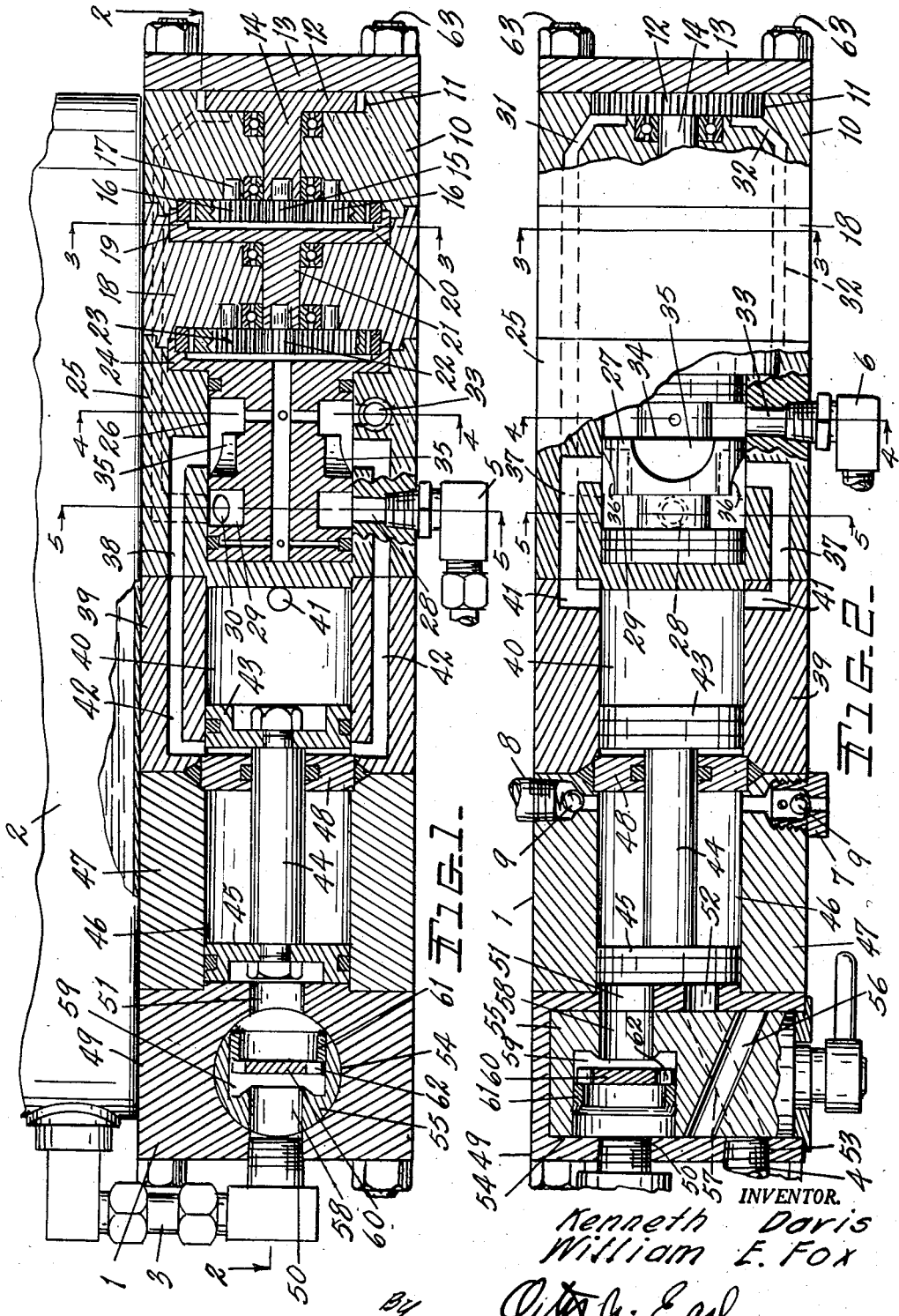

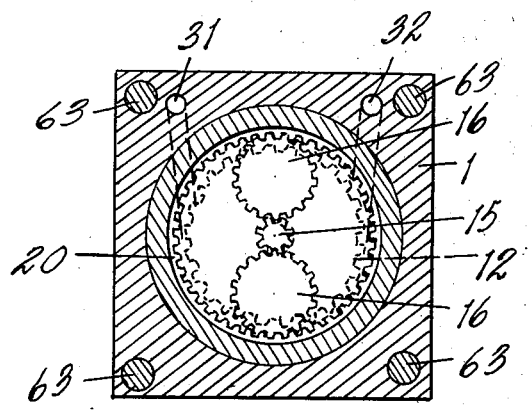
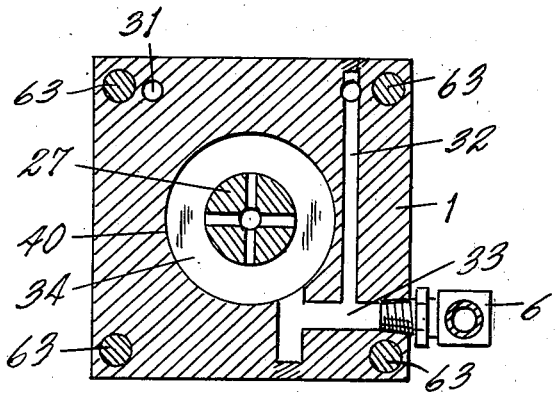
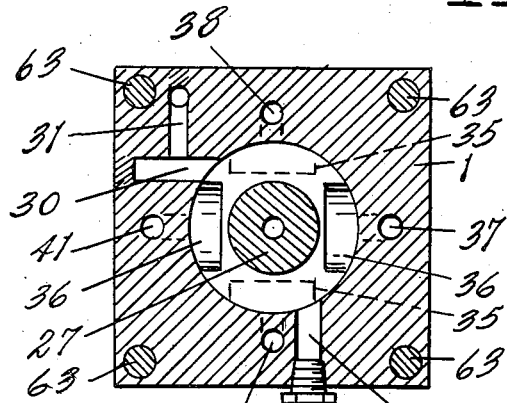

2,828,693

AUTOMATIC GREASE AND AIR PUMP FOR VEHICLES

Kenneth Davis, Decatur, and William E. Fox, Dowagiac, Mich.

Application July 6, 1954, Serial No. 441,402

11 Claims. (Cl. 103—7)

This invention relates to improvement in automatic grease and air pump for vehicles. The principal objects of this invention are:

First, to provide a compact and efficient pump which may be mounted on vehicles having hydraulic or air pressure systems to pump grease or air for servicing the vehicle or other equipment.

Second, to provide a fluid actuated reciprocating grease pump having a control valve separately driven from the same source of fluid pressure as the pump so that the pump creates a pulsating pressure in the grease even when no grease is pumped.

Third, to provide a reciprocating fluid actuated pump in which one side of the driven piston functions to pump grease or lubricant while the other side of the piston functions to pump air.

Fourth, to provide a grease pump with a novel shut off valve that acts alternatively to check the flow of lubricant into or out of the pump when the valve is reversed.

Fifth, to provide a novel and compact arrangement of a fluid motor and rotary valve with speed reduction gearing connected therebetween and rotating the valve.

Other objects and advantages of the invention will be apparent from the following description and claims. The drawing illustrates a highly practical form of the pump.

Fig. 1 is a vertical longitudinal cross sectional view through the pump with the lubricant supply tank associated with the pump illustrated partially in elevation.

Fig. 2 is a plan view of the pump partially broken away in horizontal cross section.

Fig. 3 is a vertical cross sectional view taken along the plane of the line 3—3 in Figs. 1 and 2.

Fig. 4 is a vertical cross sectional view taken along the plane of the line 4—4 in Figs. 1 and 2.

Fig. 5 is a vertical cross sectional view taken along the plane of the line 5—5 in Figs. 1 and 2.

The pump which embodies the invention is designed primarily for use on agricultural and industrial tractors having a hydraulic pressure system. The purpose of the pump is to utilize the hydraulic system of the vehicle as a power source for pressure lubricating the vehicle having the pump or other equipment which may be in proximity to the tractor. The pump also functions to pump air and can be used to inflate the tires of vehicles.

The pump includes generally a rectangular body 1 which has a lubricant or grease supply tank 2 mounted on the top thereof. Grease is admitted to the body of the pump through a coupling connection 3 and is ejected under pressure as will be described in greater detail through an outlet fitting 4. It is contemplated that the grease hose connected to the outlet fitting 4 will be provided with an integral check valve so no return check valve is incorporated in the pump. Near the middle of the body 1 and on the under side thereof as illustrated in Fig. 1 there is provided a hydraulic fluid inlet coupling 5 which is adapted to be connected to the pressure side of the hydraulic system of a tractor or other vehicle. The hydraulic fluid is returned from the pump and the body 1 through the hydraulic fluid return coupling 6 mounted on the side of the body. Air to be compressed is admitted to the body through the air inlet fitting 7 and is discharged under pressure through the air feed coupling 8. Check valves 9 are provided in the air couplings 7 and 8.

More specifically the body 1 comprises a motor block 10 having a recess 11 formed in its outer face. A rotor 12 is rotatably mounted in the recess and the motor chamber is closed by an end plate 13. The shaft 14 of the rotor extends through the motor block 10 and is provided on its inner end with pinion teeth 15. The pinion teeth 15 may be cut directly in the rotor shaft or may be formed as illustrated on a separate pinion non-rotatably secured to the rotor shaft.

A pair of intermediate gears 16 are mounted on the inner face of the motor block 10 as by the stub shafts 17 and mesh with the pinion teeth 15. Abutted against the inner face of the motor block 10 is a gear block 18 having a recess 19 opening to the inner face of the motor block. An internal ring gear 20 is mounted in the recess 19 with its teeth meshing with the intermediate gears 16 so that the ring gear is driven at a much slower speed than the motor rotor 12.

The ring gear 19 is provided with an integral shaft 21 which extends through the gear block and is provided with pinion teeth 22 on its inner end in much the same fashion as the motor shaft 14. Intermediate gears 23 mounted on the inner face of the gear block mesh with the pinion teeth 22 and drive a second ring gear 24 at a substantially slower speed than the ring gear shaft 21. The combination comprises a double reduction speed reducing gear system connected between the motor rotor 12 and the ring gear 24. Abutted against the inner face of the gear block 18 is a valve block 25 having an axially extending cylindrical valve chamber 26 formed therein. The ring gear 24 is formed integrally on the outer end of a cylindrical valve member 27 rotatably mounted in the chamber 26. The valve member 27 is thus driven from the rotor 12 at greatly reduced speed. Desirably the speed reduction between motor and the valve member is of the order of 100 to 1.

The hydraulic fluid supply coupling 5 opens through a port 28 in the valve block 25 to the space formed by an annular groove 29 in the valve member 27. A motor supply port 30 also opens continuously to the annular groove 29 and communicates with an axially extending passage formed in the valve block, gear block, and motor block to continuously deliver fluid under pressure to the rotor 12. Return fluid from the rotor 12 is directed through a return passage 32 formed in the motor block, grease block, and valve block to the outlet port 33 which communicates with the fluid return coupling 6. The valve member 27 is provided with a second annular groove 34 which communicates with the outlet port 33 at all times.

The mid portion of the valve member 27 between the grooves 29 and 34 is provided with radially and axially opposite facing recesses 35 and 36. The valve block 25 is provided at diametrically opposite sides with a pair of feed passages 37 opening to the left end of the valve block. A second pair of feed passages 38 rotated 90° from the first pair also open through the left end of the valve block 25.

Abutted against the inner end of the valve block 25 is a pump cylinder block 39 having a cylindrical chamber 40 formed therethrough. The first pair of feed passages 37 in the valve block open to the right end of the cylinder 40 through ports 41. Passages 42 formed in the pump cylinder block connect the other pair of feed passages 38 with the opposite end of the cylinder 40. It will be noticed that rotation of the valve member 27 will first connect passages 42 with the oil return port 33 through the notches 35 in the valve member while the passages 37 are connected through the notches 36 between the fluid inlet coupling 5 and the right end of the cylinder 40. Continued rotation of the valve 27 will automatically reverse the supply of hydraulic fluid between the opposite ends of the cylinder 40.

Reciprocally mounted in the cylinder 40 is a driving piston 43 that is reciprocated by hydraulic pressure. The driving piston 43 is connected by a piston rod 44 with a driven piston 45. The driven piston 45 reciprocates in an output cylinder 46 formed in the output block 47. The output block 47 is clamped tightly against the left end of the pump block and a divider ring or wall 48 is clamped between the adjacent faces of the pump block and output block. The divider plate 48 slidably and sealingly embraces piston rod 44 so that the driven piston 45 is adapted to pump air through the previous mentioned valves 9 as the piston reciprocates.

The left end of the output block 47 abuts against a grease valve block 49 which closes the left end of the cylinder 46. The grease valve block 49 has grease inlet passages 50 and 51 formed longitudinally therethrough and alined with the end of the output cylinder 46. The grease valve block 49 also has grease output ports 52 and 53 formed therethrough in radially offset relation with respect to the axis of the output cylinder. The grease valve block 49 is further transversely and cylindrically recessed as at 54 to rotatably receive the cylindrical reversing valve element 55. The grease valve element 55 has an output passage 56 formed transversely therethrough and at an angle with respect to the axis of the grease valve element so that in one rotated position of the grease valve element the passage 56 will afford communication between output ports 52 and 53 as indicated between dotted lines at 57 in Fig. 2. The passage 56 rotates out of registry with the ports 52 and 53 when the grease valve element is rotated to the off position illustrated in full lines in Fig. 2.

The grease valve element 55 has a passage 58 formed diametrically therethrough and enlarged at one end as at 59. A disc shaped check valve 60 is positioned in the enlarged portion 59 and retained by a ring 61. In the "on" rotated position of the grease valve element 55 as shown in Fig. 1, the driven piston 45 is adapted to draw grease through the grease valve element with the check valve 60 seating against the ring 61 and with grease passing through notches 62 cut in the periphery of the check valve. On the output stroke of the piston 45 the check valve 60 closes the end of the passage 58 and prevents return flow of grease back into the storage tank 2. When the grease valve 55 is rotated as shown in Fig. 2 any grease remaining in the output cylinder 46 is permitted to flow past the check valve 60 to the storage tank 2 and the reentry of grease into the cylinder 46 is prevented by seating of the check valve over the passage 58. Rotation of the grease valve element 55 through 180° will therefore condition the pump to pump grease as shown in Fig. 1 or condition the pump to shut off the supply of grease and pump air as shown in Fig. 2.

The several blocks 10, 18, 25, 39, 47 and 49 and the cover plate 13 are clamped together by bolts 63 extending longitudinally through the body.

The pump structure illustrated is extremely compact and provides a pump having sufficient capacity to handle the ordinary lubricating jobs on a farm. It can be made in a body about 12 to 15 inches long and 3 inches square. The pump is thus well adapted to be mounted on a tractor without interfering with the other parts of the tractor. No attempt has been made to disclose possible modifications of the pump structure as it is believed that a complete understanding of the construction and operation of the pump and the scope of the invention may be had from the foregoing description and the following claims.

Having thus described the invention, what is claimed to be new and what is desired to be secured by Letters Patent is:

1. A pump attachment for vehicles having a source of fluid under hydraulic pressure comprising, a first block having a fluid motor recessed into one face thereof, the shaft of the rotor of said motor extending through said first block and having pinion teeth on its end, a cover plate for said motor, a second block having a ring gear mounted on one face thereof and embracing the pinion teeth on said rotor shaft, a gear mounted on the other face of said first block and meshing with said pinion teeth and said ring gear, a shaft on said ring gear extending through said second block and having other pinion teeth formed on its other end, a valve block abutting the other face of said second block and having a cylindrical valve chamber formed therein, a cylindrical valve member rotatably mounted in said valve chamber and having a second ring gear secured to the valve member and embracing said other pinion teeth, another gear mounted on the other face of said second block and meshing with said second ring gear and said other pinion teeth, inlet and outlet passages formed in said valve block and opening to said valve chamber at axially spaced positions therealong, motor feed and return passages formed in said valve block, said second block and said first block and communicating between said motor and said inlet and outlet passages, a pump motor cylinder block abutted against the opposite end of said valve block from said second ring gear and having a piston chamber formed through the pump motor block, pump operating motor supply and exhaust passages formed in said pump block and said valve block and communicating between the opposite ends of said piston chamber and said valve chamber at axially spaced points along the valve chamber, said valve member having axially spaced annular inlet and outlet grooves formed therein and registering with said inlet and outlet passages, said valve member having angularly spaced recesses formed therein alternately communicating between said pump operating motor supply and exhaust passages and said inlet and outlet passages, an output block abutted against said pump block and having an output cylinder formed therethrough coaxially with said piston chamber, pistons reciprocable in said output cylinder and piston chamber, a piston rod connecting said pistons, a divider wall clamped between said pump block and output block and sealingly embracing said piston rod, inlet and outlet air passages having check valves therein and formed in said output block and communicating with said output cylinder adjacent said divider wall, a grease valve block abutting the end of said output block and having grease supply and delivery passages formed therethrough and communicating with the end of said output cylinder, said grease valve block having a cylindrical recess formed therein transversely of and intersecting said grease supply and delivery passages, a cylindrical grease valve element rotatably positioned in said recess in said grease valve block and having inlet and outlet ports formed transversely through the grease valve element, the inlet port registering with the grease supply passage in oppositely rotated positions of the grease valve element, the outlet port registering with the delivery passage in only one adjusted position of the grease valve, a check valve positioned in the inlet port in said grease valve element and rotatable therewith to close outwardly of said output cylinder when said outlet passage in said grease valve element is in registry with said delivery passage, and bolts extending through the corner portions of said blocks and holding said blocks together.

2. A pump attachment for vehicles having a source of fluid under hydraulic pressure comprising, a first block having a fluid motor recessed into one face thereof, the shaft of the rotor of said motor extending through said first block and having pinion teeth on its end, a cover plate for said motor, a second block having a ring gear mounted on one face thereof and embracing the pinion teeth on said rotor shaft, a gear mounted on the other face of said first block and meshing with said pinion teeth and said ring gear, a valve block connected to said first block and having a cylindrical valve chamber formed therein, a cylindrical valve member rotatably mounted in said valve chamber and drivingly connected to said ring gear, inlet and outlet passages formed in said valve block and opening to said valve chamber, motor feed and return passages formed in said valve block and said first block and communicating between said motor and said inlet and outlet passages, a pump motor cylinder block abutted against the opposite end of said valve block from said ring gear and having a piston chamber formed through the pump motor block, pump operating motor supply and exhaust passages formed in said pump block and said valve block and communicating between the opposite ends of said piston chamber and said valve chamber, said valve member having angularly spaced recesses formed therein alternately communicating between said pump operating motor supply and exhaust passages and said inlet and outlet passages, an output block abutted against said pump block and having an output cylinder formed therethrough coaxially with said piston chamber, pistons reciprocable in said output cylinder and piston chamber, a piston rod connecting said pistons, a divider wall between said pump block and output block and sealingly embracing said piston rod, inlet and outlet air passages having check valves therein and formed in said output block and communicating with said output cylinder adjacent said divider wall, a grease valve block abutting the end of said output block and having grease supply and delivery passages formed therethrough and communicating with the end of said output cylinder, said grease valve block having a cylindrical recess formed therein transversely of and intersecting said grease supply and delivery passages, a cylindrical grease valve element rotatably positioned in said recess in said grease valve block and having inlet and outlet ports formed transversely through the grease valve element, the inlet port registering with the grease supply passage in oppositely rotated positions of the grease valve element, the outlet port registering with the delivery passage in only one adjusted position of the grease valve, a check valve positioned in the inlet port in said grease valve element and rotatable therewith to close outwardly of said output cylinder when said outlet passage in said grease valve element is in registry with said delivery passage, and means holding said blocks together.

3. A pump attachment for vehicles having a source of fluid under hydraulic pressure comprising, a block having a fluid motor recessed into one face thereof, a cover plate for said motor, a cylindrical valve chamber formed in said block, a cylindrical valve member rotatably mounted in said valve chamber, reduction gearing connecting said motor to said valve member, inlet and outlet passages formed in said block, motor feed and return passages formed in said block and communicating between said motor and said inlet and outlet passages, a piston chamber formed in said block, pump operating motor supply and exhaust passages formed in said block and communicating between the opposite ends of said piston chamber and said valve chamber, said valve member having angularly spaced recesses formed therein alternately communicating between said pump operating motor supply and exhaust passages and said inlet and outlet passages, an output cylinder formed in said block coaxially with said piston chamber, pistons reciprocable in said output cylinder and piston chamber, a piston rod connecting said pistons, a divider wall between said piston chamber and output cylinder and sealingly embracing said piston rod, inlet and outlet air passages having check valves therein and formed in said block and communicating with said output cylinder adjacent said divider wall, grease supply and delivery passages formed in said block and communicating with the end of said output cylinder, said block having a cylindrical recess formed therein transversely of and intersecting said grease supply and delivery passages, a cylindrical grease valve element rotatably positioned in said recess in said block and having inlet and outlet ports formed transversely through the grease valve element, the inlet port registering with the grease supply passage in oppositely rotated positions of the grease valve element, the outlet port registering with the delivery passage in only one adjusted position of the grease valve, and a check valve positioned in the inlet port in said grease valve element and rotatable therewith to close outwardly of said output cylinder when said outlet passage in said grease valve element is in registry with said delivery passage.

4. A pump attachment for vehicles having a source of fluid under hydraulic pressure comprising, a first block having a fluid motor recessed into one face thereof, the shaft of the rotor of said motor extending through said first block and having pinion teeth on its end, a cover plate for said motor, a second block having a ring gear mounted on one face thereof and embracing the pinion teeth on said rotor shaft, a gear mounted on the other face of said first block and meshing with said pinion teeth and said ring gear, a shaft on said ring gear extending through said second block and having other pinion teeth formed on its other end, a valve block abutting the other face of said second block and having a cylindrical valve chamber formed therein, a cylindrical valve member rotatably mounted in said valve chamber and having a second ring gear secured to the valve member and embracing said other pinion teeth, another gear mounted on the other face of said second block and meshing with said second ring gear and said other pinion teeth, inlet and outlet passages formed in said valve block and opening to said valve chamber at axially spaced positions therealong, motor feed and return passages formed in said valve block, said second block and said first block and communicating between said motor and said inlet and outlet passages, a pump motor cylinder block abutted against the opposite end of said valve block from said second ring gear and having a piston chamber formed through the pump block, pump operating motor supply and exhaust passages formed in said pump block and said valve block and communicating between the opposite ends of said piston chamber and said valve chamber at axially spaced points along the valve chamber, said valve member having angularly spaced recesses formed therein alternately communicating between said pump operating motor supply and exhaust passages and said inlet and outlet passages, an output block abutted against said pump motor block and having an output cylinder formed therethrough coaxially with said piston chamber, pistons reciprocable in said output cylinder and piston chamber, a piston rod connecting said pistons, a divider wall between said pump block and output block and sealingly embracing said piston rod, inlet and outlet air passages having check valves therein and formed in said output block and communicating with said output cylinder adjacent said divider wall, a grease valve block abutting the end of said output block and having grease supply and delivery passages formed therethrough and communicating with the end of said output cylinder, and a reversible check valve mounted in said grease supply passage.

5. A pump attachment for vehicles having a source of fluid under hydraulic pressure comprising, a first block having a fluid motor recessed into one face thereof, the shaft of the rotor of said motor extending through said first block and having pinion teeth on its ends, a cover plate for said motor, a second block having a ring gear mounted on one face thereof and embracing the pinion teeth on said rotor shaft, a gear mounted on the outer face of said first block and meshing with said pinion teeth and said ring gear, a shaft on said ring gear extending through said second block and having other pinion teeth formed on its other end, a valve block abutting the other face of said second block and having a cylindrical valve chamber formed therein, a cylindrical valve member rotatably mounted in said valve chamber and having a second ring gear secured to the valve member and embracing said other pinion teeth, another gear mounted on the other face of said second block and meshing with said second ring gear and said other pinion teeth, inlet and outlet passages formed in said valve block and opening to said valve chamber at axially spaced positions therealong, motor feed and return passages formed in said valve block, said second block and said first block and communicating between said motor and said inlet and outlet passages, a pump motor cylinder block abutted against the opposite end of said valve block from said second ring gear and having a piston chamber formed through the pump block, pump operating motor supply and exhaust passages formed in said pump block and said valve block and communicating between the opposite ends of said piston chamber and said valve chamber at axially spaced points along the valve chamber, said valve member having angularly spaced recesses formed therein alternately communicating between said pump operating motor supply and exhaust passages and said inlet and outlet passages, an output block abutted against said pump motor block and having an output cylinder formed therethrough coaxially with said piston chamber, pistons reciprocable in said output cylinder and piston chamber, a piston rod connecting said pistons, a divider wall between said pump block and output block and sealingly embracing said piston rod, a grease valve block abutting the end of said output block and having grease supply and delivery passages formed therethrough and communicating with the end of said output cylinder, and a reversible check valve mounted in said grease supply passage.

6. A pump attachment for vehicles having a source of fluid under hydraulic pressure comprising, a block having a fluid motor mounted therein, a cylindrical valve chamber formed in said block, a cylindrical valve member rotatably mounted in said valve chamber and drivingly connected to said motor, inlet and outlet passages formed in said block and opening to said valve chamber, motor feed and return passages formed in said block and communicating between said motor and said inlet and outlet passages, a piston chamber formed in said block, pump operating motor supply and exhaust passages formed in said block and communicating between the opposite ends of said piston chamber and said valve chamber, said valve member having angularly spaced recesses formed therein alternately communicating between said pump operating motor supply and exhaust passages and said inlet and outlet passages, an output cylinder formed in said block, pistons reciprocable in said output cylinder and piston chamber, a piston rod connecting said pistons, a divider wall between said pistons and sealingly embracing said piston rod, inlet and outlet air passages having check valves therein and formed in said output block and communicating with said output cylinder adjacent said divider wall, grease supply and delivery passages formed in said block and communicating with the end of said output cylinder, and a reversible check valve positioned in said grease supply passage.

7. A pump attachment for vehicles having a source of fluid under hydraulic pressure comprising, a block having a fluid motor mounted therein, a cylindrical valve chamber formed in said block, a cylindrical valve member rotatably mounted in said valve chamber and drivingly connected to said motor, inlet and outlet passages formed in said block and opening to said valve chamber, motor feed and return passages formed in said block and communicating between said motor and said inlet and outlet passages, a piston chamber formed in said block, pump operating motor supply and exhaust passages formed in said block and communicating between the opposite ends of said piston chamber and said valve chamber, said valve member having angularly spaced recesses formed therein alternately communicating between said pump operating motor supply and exhaust passages and said inlet and outlet passages, an output cylinder formed in said block, pistons reciprocable in said output cylinder and piston chamber, a piston rod connecting said pistons, a divider wall between said pistons and sealingly embracing said piston rod, grease supply and delivery passages formed in said block and communicating with the end of said output cylinder, and a reversible check valve positioned in said grease supply passage.

8. A grease pump attachment for vehicles having a source of fluid under pressure comprising, a pump body, a grease pump piston reciprocable in said body, a double acting fluid actuated driving piston reciprocable in said body and drivingly connected in coaxial relation to said grease pump piston, grease inlet and outlet passages in said body communicating with said grease pump piston, a reversible check valve in said grease inlet passage, fluid supply and return passages formed in said block and adapted to be connected to said source, a rotary valve in said body arranged to alternately connect said fluid supply and return passages to opposite ends of said driving piston, air inlet and outlet passages having check valves therein formed in said body and opening to the opposite side of said grease pump piston from said grease inlet passage, a rotary fluid motor in said body arranged coaxially with said rotary valve, constantly open motor inlet and outlet passages formed in said body and communicating between opposite sides of said motor and said fluid supply and return passages, and reduction gearing in said body drivingly connecting said motor to said valve, said reduction gearing including a plurality of sets of serially connected central pinions and surrounding ring gears with fixedly pivoted gears meshing between each central pinion and the associated ring gear.

9. A grease pump attachment for vehicles having a source of fluid under pressure comprising, a pump body, a grease pump piston reciprocable in said body, a double acting fluid actuated driving piston reciprocable in said body and drivingly connected to said grease pump piston, grease inlet and outlet passages in said body communicating with said grease pump piston, fluid supply and return passages formed in said block and adapted to be connected to said source, a rotary valve in said body arranged to alternately connect said fluid supply and return passages to opposite ends of said driving piston, a rotary fluid motor in said body, motor inlet and outlet passages formed in said body and communicating between opposite sides of said motor and said fluid supply and return passages, and reduction gearing in said body drivingly connecting said motor to said valve, said reduction gearing including a central pinion and surrounding ring gear with a fixedly pivoted gear meshing between the central pinion and the associated ring gear.

10. A grease pump attachment for vehicles having a source of fluid under pressure comprising, a pump body, a grease pump piston reciprocable in said body, a fluid actuated driving piston reciprocable in said body and drivingly connected to said grease pump piston, grease inlet and outlet passages in said body communicating with said grease pump piston, fluid supply and return passages formed in said body and adapted to be connected to said source, a rotary valve in said body arranged to alternately connect said fluid supply and return passages to opposite ends of said driving piston, a rotary fluid motor in said body, means forming motor inlet and outlet passages communicating between opposite sides of said motor and said fluid supply and return passages, and reduction gearing in said body drivingly connecting said motor to said valve, said reduction gearing including a central pinion and surrounding ring gear with a fixedly pivoted gear meshing between the central pinion and the associated ring gear.

11. A grease pump attachment for vehicles having a source of fluid under pressure comprising, a pump body, a grease pump piston reciprocable in said body, a double acting fluid actuated driving piston reciprocable in said body and drivingly connected in coaxial relation to said grease pump piston, grease inlet and outlet passages in said body communicating with said grease pump piston, a cylindrical valve carrier rotatable in said body and intersecting said grease inlet passage, said carrier having a port formed therethrough to communicate with said grease inlet passage on both sides of said carrier, a check valve in said port that is reversed in said grease inlet passage upon rotation of said carrier, fluid supply and return passages formed in said body and adapted to be connected to said source, a rotary valve in said body arranged to alternately connect said fluid supply and return passages to opposite ends of said driving piston, air inlet and outlet passages having check valves therein formed in said body and opening to the opposite side of said grease pump piston from said grease inlet passage, a rotary fluid motor in said body arranged coaxially with said rotary valve, means forming motor inlet and outlet passages communicating between opposite sides of said motor and said fluid supply and return passages, and reduction gearing in said body drivingly connecting said motor to said valve, said reduction gearing including a central pinion and surrounding ring gear with a fixedly pivoted gear meshing between said central pinion and the ring gear.

References Cited in the file of this patent
UNITED STATES PATENTS

| | | |
|---|---|---|
| 1,519,670 | Danstrup | Dec. 16, 1924 |
| 2,036,464 | Dodge | Apr. 7, 1936 |
| 2,142,329 | Nika | Jan. 3, 1939 |
| 2,486,495 | Rider | Nov. 1, 1949 |